United States Patent [19]
Kovacik et al.

[11] Patent Number: 5,645,147
[45] Date of Patent: Jul. 8, 1997

[54] AUTOMATICALLY SWITCHED TROUBLE LIGHT AND RETRACTING CORD REEL APPARATUS

[75] Inventors: James D. Kovacik, Brecksville; Paul S. Blanch, Broadview Heights, both of Ohio

[73] Assignee: Alert Lite Safety Products Co. Inc., Bedford Heights, Ohio

[21] Appl. No.: 553,879

[22] Filed: Nov. 6, 1995

[51] Int. Cl.[6] .................................................. H02G 11/02
[52] U.S. Cl. .................... 191/12.2 R; 191/12.4; 200/61.15
[58] Field of Search ................ 439/4, 501; 191/12.2 R, 191/12.4; 200/61.14, 61.15

[56] References Cited

U.S. PATENT DOCUMENTS

| | | | |
|---|---|---|---|
| 1,357,900 | 11/1920 | Redmon et al. | 191/12.4 X |
| 3,619,518 | 11/1971 | Blanch et al. | 191/12.2 R |
| 3,715,526 | 2/1973 | Blanch et al. | 191/12.2 R |
| 3,808,382 | 4/1974 | Blanch et al. | 191/12.2 R |
| 3,904,843 | 9/1975 | Kendechy | 200/332 |
| 4,154,324 | 5/1979 | Upton et al. | 191/12.2 R |
| 4,300,665 | 11/1981 | Arechaga | 191/12.4 |
| 4,350,850 | 9/1982 | Kovacik et al. | 191/12.2 R |
| 4,378,473 | 3/1983 | Noorigian | 439/501 X |
| 4,726,538 | 2/1988 | Kovacik et al. | 242/376 |
| 5,101,082 | 3/1992 | Simmons et al. | 191/12.2 R |

*Primary Examiner*—David A. Bucci
*Assistant Examiner*—Scott L. Lowe
*Attorney, Agent, or Firm*—Howard & Howard

[57] ABSTRACT

An apparatus for automatically switching on and off a trouble light connected to a retracting extension cord reel assembly is mounted on a cord reel housing. The assembly includes a cord reel having a housing, an extension cord extending through an opening in the cord reel housing, a trouble light connected to the extension cord, an extension cord retracting mechanism for automatically rewinding the extension cord into the cord reel housing and a stop attached to the extension cord for engaging the cord reel housing and stopping rewinding of the extension cord. A switch apparatus includes a switch housing, an electrical switch and an actuating arm for actuating the switch.

8 Claims, 2 Drawing Sheets

1

AUTOMATICALLY SWITCHED TROUBLE LIGHT AND RETRACTING CORD REEL APPARATUS

BACKGROUND OF THE INVENTION

The present invention relates generally to a trouble light and retracting cord reel assembly and, in particular, to an apparatus for automatically switching on and off such a trouble light.

In work places such as automobile repair garages, machine shops and the like, it is frequently desirable to have a trouble light that is both readily available and easily returned to storage. Spring-retracted reels carrying an extension cord for the trouble light are widely used for this purpose. The reel is typically suspended overhead with the trouble light brought to the work site by pulling the light to unwind the cord. A conventional switch located on a handgrip for the light turns the light on and off.

Electric cord reels have been in use for many years, such as for paying out and receiving electric cords for lead lights, various electrical household appliances like sweepers, and in general, wherever insulated electric conductors are to be selectively extended and retracted with respect to a relatively stationary point. While exterior designs may vary, electric cord reels basically comprise a reel and a shaft mounted to rotate relative to each other, a cooperating ratchet and pawl means carried by the shaft and reel respectively to arrest the turning of the reel at one of several selective rotary stations when the length of the cord paid out reaches a desired length, a coiled spring designed to rotate the reel in a direction to rewind the cord on to the reel when the ratchet and pawl are disengaged and an electrical power input means including a commutator and the insulated electrical power cord itself. Such devices are shown in the U.S. Pat. Nos. 3,619,518, 3,715,526 and 3,808,382.

The U.S. Pat. No. 3,904,843 shows a retracting reel for an electrical cord in which the current in the cord is switched in response to whether the cord is wound or unwound from the reel. In the wound condition, a ball stop carried on the cord engages a balance lever which opens a normally closed switch wired in series with the cord. As the cord is unwound for use, the ball stop moves off the lever, thereby allowing the lever to pivot off the switch.

SUMMARY OF THE INVENTION

The present invention concerns an apparatus for automatically switching on and off a trouble light connected to a retracting extension cord reel assembly. The assembly includes a cord reel having a housing, an extension cord extending through an opening in the cord reel housing, a trouble light connected to the extension cord, an extension cord retracting mechanism for automatically rewinding the extension cord into the cord reel housing and a stop attached to the extension cord for engaging the cord reel housing and stopping rewinding of the extension cord. A switch apparatus includes a switch housing, a switch means and an actuating arm for actuating the switch means.

The switch housing is mounted on an exterior side surface of the cord reel housing and has an open side facing the exterior side surface. An end of the switch housing has an actuating arm opening formed therein and the switch housing has a pivot post formed therein. The switch means is mounted in the switch housing and is connected between a power cord and the extension cord. The switch means is biased to a normally closed position for electrically connecting the power cord to the extension cord. The actuating arm is pivotally mounted on the pivot post and has a first portion extending outside the switch housing through the actuating arm opening for contacting the stop on the extension cord. The actuating arm has a second portion with a cam formed thereon for contacting an actuating lever on the switch means when the first portion contacts the stop for actuating the switch means to an open position to electrically disconnect the extension cord from the power cord. The switch housing includes a pair of mounting posts for mounting the switch means and a plurality of bosses each having an opening formed therein for retaining a threaded fastener to attach the switch housing to the cord reel housing.

It is an object of the present invention to provide a trouble light and retractable cord reel which automatically switches on the trouble light when the extension cord is unwound and automatically switches off the trouble light when the extension cord is fully rewound.

It is a further object of the present invention to provide an automatic switching apparatus for a trouble light and retractable cord reel which can be installed on a conventional cord reel housing with minimum modifications.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
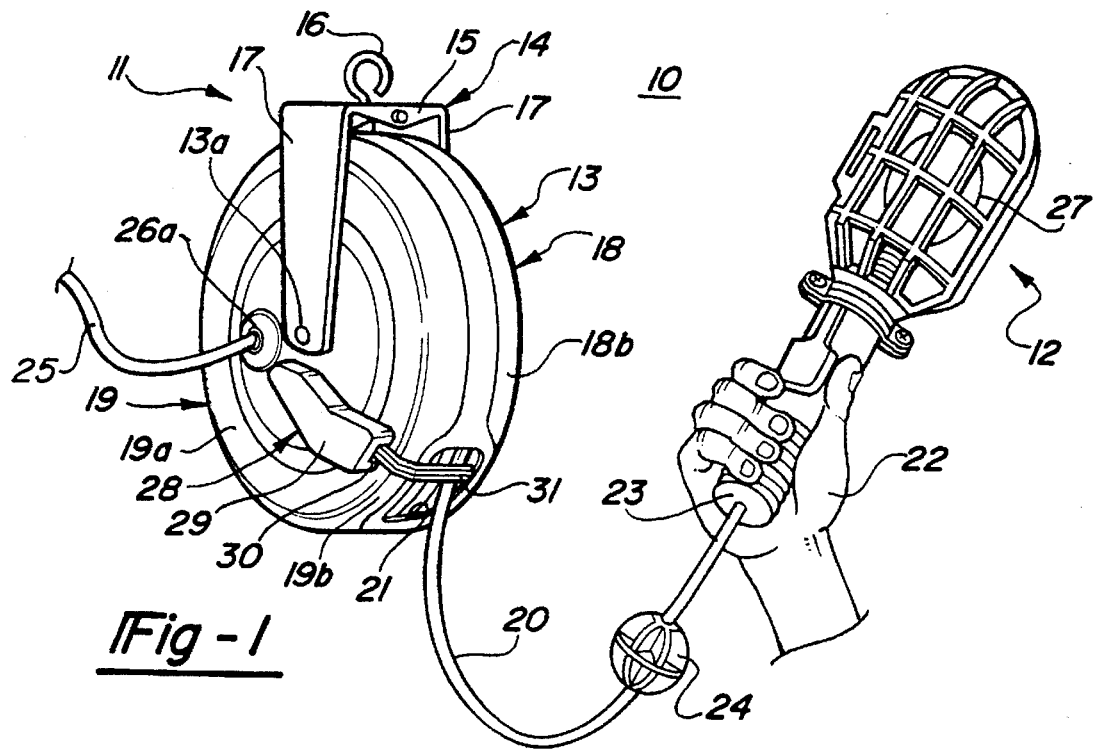
FIG. 1 is a perspective view of a trouble light and retracting extension cord reel assembly in accordance with the present invention.
Figure 3:
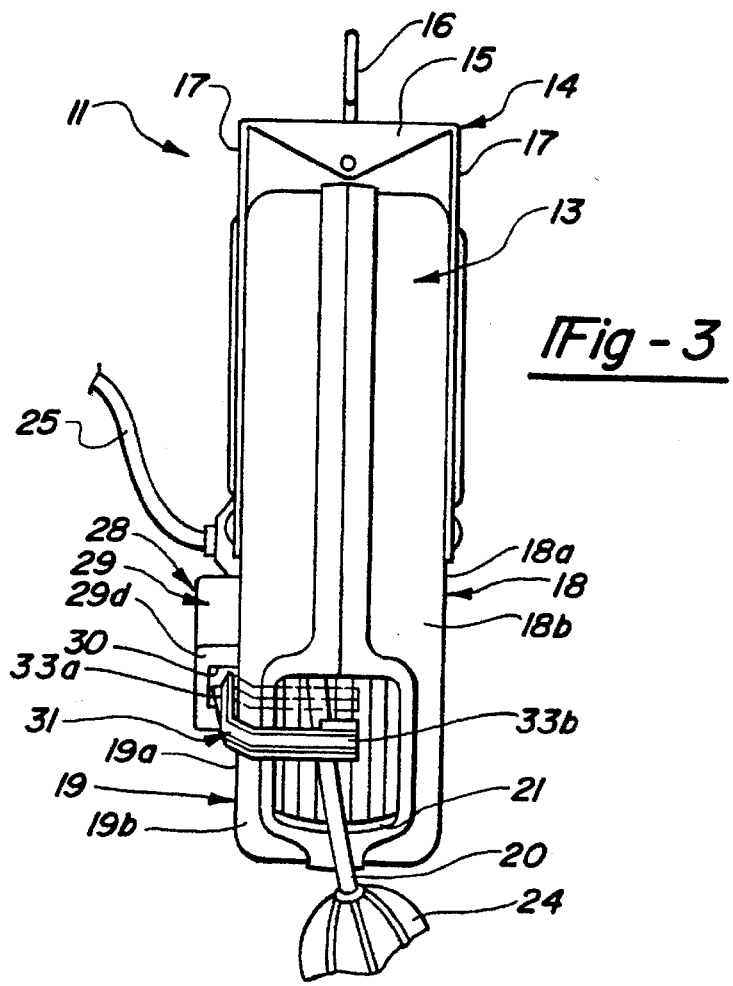
FIG. 3 is a front elevation view of the cord reel shown in the FIG. 1.

There is shown in the FIG. 1 a trouble light and retracting extension cord reel assembly 10 including a retracting cord reel 11 and a hand held trouble light 12. The cord reel 11 has a cord reel housing 13 supported at a central axis 13a by a generally U-shaped bracket 14. The bracket 14 is formed with a generally horizontally extending center portion 15 having a hook 16 attached thereto for suspending the assembly 10, for example, from the ceiling of a workshop or a garage. Extending downwardly from opposite ends of the center portion 15 are a pair of legs 17. The cord reel housing 13 can be formed by a pair of generally cup-shaped shells, such as a right side shell 18 and a left side shell 19. The shell 18 has a generally planar side wall 18a extending generally transverse to the axis 13a. An end wall 18b extends generally parallel to the axis 13a from a periphery of the side wall 18b. The left shell 19 is constructed in a similar manner with a side wall 19a and an end wall 19b. The legs 17 extend adjacent an exterior surface of the side walls 18a and 19a of the housing 13. A lower free end of each of the legs 17 is attached to the corresponding one of the right side wall 18a (FIG. 3) of the right shell 18 and the left side wall 19a of the left shell 19 at the central axis 13a of the housing 13.

The housing 13 can enclose an automatic pulley (not shown) of the type described in the U.S. Pat. No. 4,726,538. Such a pulley can be rotatably mounted in the housing 13 on the central axis 13a and includes conventional electrical and mechanical connections for the trouble light 12 and an extension cord retracting mechanism as described in the patent. As shown in the FIG. 1, an electrical extension cord 20 has one end extending into the housing 13 through a cord opening 21 formed in the end walls 18b and 19b. An opposite end of the cord 20 is attached and electrically connected to the trouble light 12. The one end of the cord 20 extending through the opening 21 is mechanically attached to the pulley (not shown) in the housing 13 and is electrically connected to slip rings (not shown). The retracting mechanism (not shown) inside the housing 13 permits the cord 20 to be unwound from the pulley in response to a pulling force exerted by a human hand 22 typically grasping a handle 23 of the trouble light 12. When the pulling force is discontinued, the retracting mechanism has a detent to prevent the automatic rewinding of the extension cord 20. However, an additional pull on the cord 20 will disengage the detent and the pulley inside the housing 13 will automatically be rotated in a direction to rewind the extension cord.

A stop 24, typically in the form of a molded ball, is attached to the extension cord 20 adjacent the trouble light and is larger in size than the opening 21 to prevent further retraction of the cord 20 by the cord reel means 11. Electrical power is provided to the trouble light 12 through the extension cord 20 by a power cord 25 having one end (not shown) connected to a conventional male electrical plug for insertion into an electrical power socket. An opposite end of the power cord 25 extends through an aperture 26a formed in the left side 19 of the housing 13. In many conventional trouble light and retracting extension cord reel assemblies, the power cord is always electrically connected to the extension cord and the turning on and off of a lamp in the trouble light is controlled by a switch in the handle. However, as will be described below, the switching on and off of a lamp 27 in the trouble light 12 is controlled automatically in the assembly 10 according to the present invention by a switch apparatus 28 mounted on the exterior surface of the left side wall 19a of the housing 13.

Figure 2:
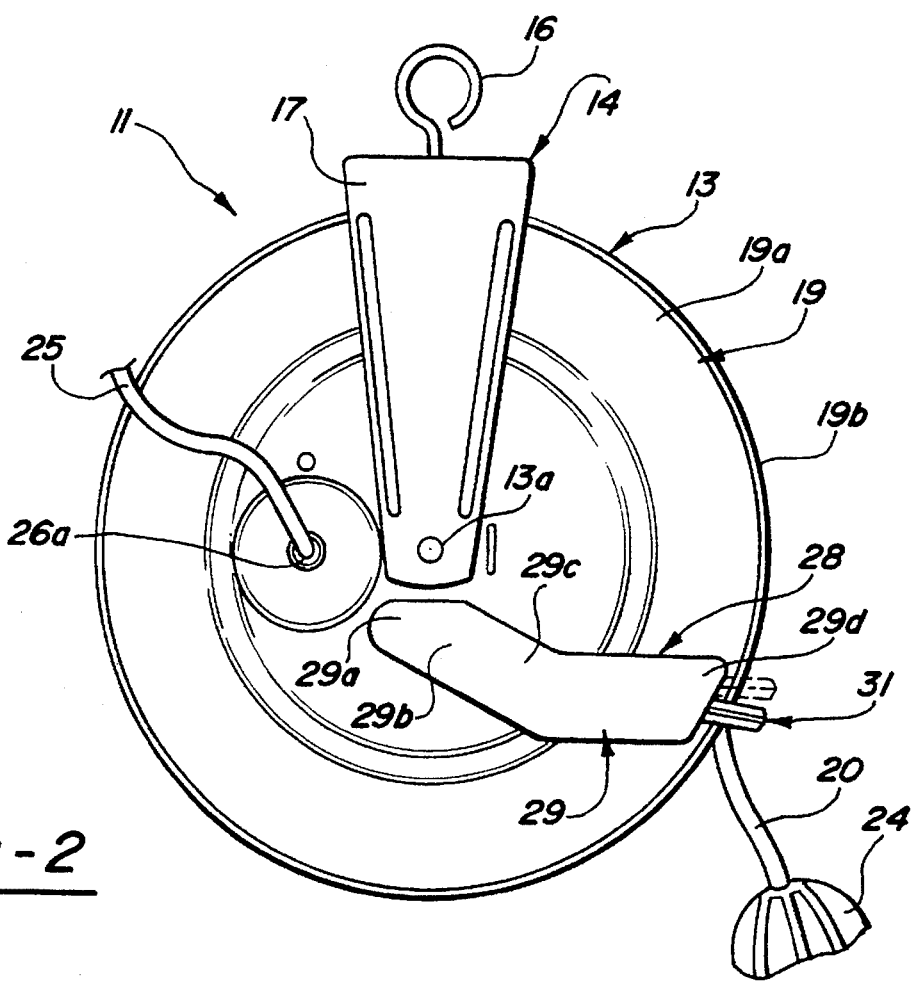
FIG. 2 is left side elevation view of the cord reel shown in the FIG. 1.
Figure 4:
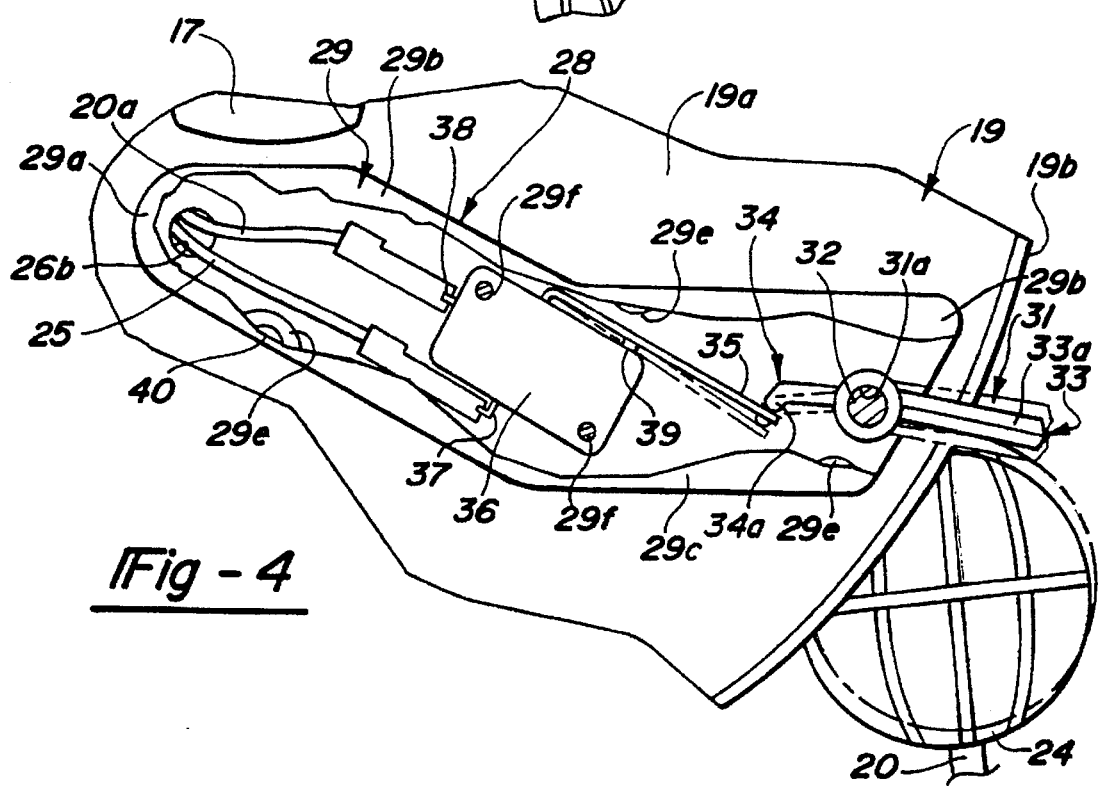
FIG. 4 is an enlarged fragmentary view in partial cross-section of the trouble light switch in the FIG. 1.

As best shown in the FIG. 2 through the FIG. 4, the switch apparatus 28 includes a generally elongated switch housing 29 having an open side facing the exterior surface of the left side wall 19a and one end 29a positioned adjacent the aperture 26 and the central axis 13a. The housing 29 extends generally radially along the left side wall 19a for a first portion 29b and has a second portion 29c extending generally horizontally to an opposite end 29d adjacent the opening 21. An actuating arm opening 30 is formed in the end 29d of the housing 29. A generally L-shaped actuating arm 31 rotatably mounted inside the switch housing 29 extends through the opening and has a free end extending in front of at least a portion of the cord opening 21. The actuating arm 31 is positioned such that the cord 20 exits the opening 21 below the actuating arm. The switch housing 29 can be formed of a suitable material such as a high impact ABS plastic and the actuating arm 31 also can be formed of a suitable material such as a polycarbonate sold under the name "LEXAN 121".

As best shown in the FIG. 4, the actuating arm 31 is pivotally mounted on a pivot post 32 extending through an aperture 31a formed in the actuating arm. The post 32 extends from an interior surface of the switch housing 29 toward the side wall 19a adjacent the end 29d. A first portion 33 of the actuating arm 31 extends forwardly from the aperture 31a and has a first segment 33a extending generally parallel to the exterior surface of the left side wall 19a of the cord reel housing 13 and through the actuating arm opening 30. A second segment 33b of the first portion 33 is attached to the first portion 33a and extends generally parallel to the axis 13a in front of the cord opening 21 and spaced from the end wall 19b. A second portion 34 of the actuating arm 31 extends rearwardly from the aperture 31a and has a free end with a cam 34a formed thereon for engaging a free end of an actuating lever 35. An opposite end of the actuating lever 35 is attached to a case of an electrical switch 36 mounted inside the switch housing 29. The case of the switch 36 has a pair of apertures formed therein for mounting the switch on a corresponding pair of mounting posts 29f formed inside the switch housing 29. The ends of the posts 29f can be hot staked to secure the switch 36 in place.

The switch 36 has a first electrical terminal 37 connected to a conductor 25a of the power cord 25 and a second electrical terminal 38 connected to a conductor 20a. The conductor 20a is connected through one of the slip rings (not shown) in the housing 13 to the one end of the extension cord 20. The conductors 20a and 25a extend from inside the cord reel housing 13 through a second aperture 26b formed in the side wall 19a and into the switch housing 29. Each of the extension cord 20 and the power cord 25 have a second conductor (not shown) which conductors are connected together through the other slip ring (not shown) inside the cord reel housing 13 in a conventional manner to complete an electrical circuit for the trouble light 12. The electrical switch 36 is of the normally closed type such that when a switch button 39 is not depressed, internal switch contacts are closed and there is an electrical circuit between the terminals 37 and 38. The switch housing 29 can be attached to the side wall 19a by any suitable means such as a threaded fastener 40 extending through an aperture (not shown) formed in the side wall 19a and threadably engaging an opening in a corresponding one of a plurality of bosses 29e formed in the switch housing.

When the extension cord 20 is fully retracted into the housing 13, the stop 24 is in the position shown in phantom in the FIG. 4. The stop 24 abuts the second segment 33b of the first portion 33 of the actuating arm 31 and rotates the actuating arm in a counterclockwise direction about the post 32 to the position shown in phantom. Likewise, the second portion 34 of the arm 31 is rotated in a counterclockwise direction to the position shown in phantom to engage the cam 34a with the actuating lever 35. The actuating lever 35 is forced into the position shown in phantom thereby abutting and depressing the switch button 39 which extends from the case of the switch 36. As stated above, the electrical switch 36 is of the normally closed type such that when the switch button 39 is not depressed, internal switch contacts are closed and there is an electrical circuit between the terminals 37 and 38. Therefore, electrical power can flow from the power cord 25 through the switch 36 and the extension cord 20 to light the lamp 27. However, when the switch button 39 is depressed, the internal switch contacts are open and there is no electrical circuit between the terminals 37 and 38. Therefore, electrical power cannot flow from the power cord 25 through the switch 36 and the extension cord 20 and the lamp 27 is turned off.

The automatic cord retracting mechanism exerts a rewinding force on the extension cord 20 to maintain the stop 24, the actuating arm 31, the actuating lever 35 and the switch button 39 in the positions shown in phantom in the FIG. 4. As soon as the cord 20 is drawn from the housing 13, the stop 24 is moved away from the cord opening 21 to the position shown in solid line in the FIG. 4. The switch button 39 is spring loaded such that when the pressure exerted by the stop 24 is removed, the switch button 39 forces the actuating lever 35 away from the switch 36 to the solid line position. This movement of the actuating lever 35 rotates the actuating arm 31 in a clockwise direction to the solid line position. In addition, the first portion 33 of the actuating arm 31 is longer and has a larger cross section than the second portion 34 such that the influence of gravity tends to rotate the actuating arm in the clockwise direction. Now electrical contact is made between the switch terminals 37 and 38 thereby allowing electrical current to flow through the power cord 25 and the extension cord 20 to automatically light the lamp 27. The lamp 27 remains lighted until the cord 20 is fully retracted and the stop 24 again engages the actuating arm 31 to move the actuating lever 35 and the switch button 39 back to the position shown in phantom an automatically turn off the lamp.

The construction of the switch apparatus 28 is such that it can be installed on a conventional cord reel housing with minimum modifications. The housing 29, actuating arm 31 and switch 36 are constructed as a unit which unit mounts on the exterior surface of the side wall 19a. The only modifications required are forming the second aperture 26b and the apertures for the fasteners 40 in the side wall 19a and connecting the conductors 20a and 25a to the switch 36.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A unitary switch apparatus for a trouble light and retracting extension cord reel assembly, the assembly including a cord reel having a housing, an extension cord extending through an opening in the cord reel housing, a trouble light connected to the extension cord, an extension cord retracting mechanism for rewinding the extension cord into the cord reel housing and a stop attached to the extension cord for engaging the cord reel housing and stopping rewinding of the extension cord, the unitary switch apparatus comprising:

an elongated switch housing formed of a plastic material and adapted to be mounted on an exterior side surface of the cord reel housing, said switch housing having an open side for facing the exterior side surface of the cord reel housing and an end having an actuating arm opening formed therein, said switch housing having a pivot post, at least one mounting post and at least one boss formed on an interior surface thereof;

a fastener means for engaging said boss, said fastener means adapted to attach to the exterior side surface of the cord reel housing for mounting said switch housing;

a switch means for establishing an electrical connection or disconnection attached to said mounting post in said switch housing and adapted to be connected between a power cord and the extension cord connected to the trouble light, said switch means being biased to a normally closed position for electrically connecting the power cord to the extension cord; and an actuating arm pivotally mounted in said switch housing on said pivot post and having a first portion extending partially outside said switch housing through said actuating arm opening for contacting the stop on the extension cord and a second portion inside said housing for actuating said switch means whereby when said switch housing is mounted on the cord reel housing by said fastener means and said boss, and said switch means is connected between the power cord and the extension cord, said actuating arm is rotated about said pivot post by contact with the stop on the extension cord to actuate said switch means to an open position to electrically disconnect the extension cord from the power cord and wherein said switch housing, said switch means and said actuating arm are removable from the cord reel housing as a unit.

2. The unitary switch apparatus according to claim 1 wherein said switch housing includes a pair of said mounting posts for mounting said switch means.

3. The unitary apparatus according to claim 1 wherein said at least one boss includes a plurality of bosses, each having an opening formed therein for retaining a threaded fastener to attach said switch housing to the cord reel housing.

4. The unitary switch apparatus according to claim 1 wherein said plastic material is a relatively high impact ABS plastic material.

5. The unitary switch apparatus according to claim 1 wherein said actuating arm second portion has a cam formed thereon for contacting an actuating lever on said switch means and actuating said switch means to said open position.

6. The unitary switch apparatus according to claim 1 wherein said actuating arm is formed of a polycarbonate material.

7. A trouble light and retracting extension cord reel assembly comprising:

a retracting cord reel including a cord reel housing having a side wall and an end wall, said end wall having a cord opening formed therein;

a hand held trouble light;

an extension cord extending through said cord opening and having one end connected to said retracting cord reel and an opposite end connected to said trouble light;

a stop attached to said extension cord adjacent said hand held trouble light;

a power cord having one end adapted to be connected to a source of electrical power and an opposite end extending into said cord reel housing;

a switch housing mounted on an exterior surface of said side wall of said cord reel housing adjacent said cord opening, said switch housing having an open side facing said exterior surface of the cord reel housing and an actuating arm opening formed therein, said switch housing having a pivot post, at least one mounting post and at least one boss formed on an interior surface thereof, said switch housing being attached to the exterior surface of the cord reel by fastener means engaging said boss;

a switch means for establishing an electrical connection or disconnection mounted in said switch housing on said mounting post and being connected between said opposite end of said power cord and said one end of said extension cord, said switch means being biased to a normally closed position for electrically connecting said power cord to said extension cord; and an actuating arm rotatably mounted in said switch housing on said pivot post and having a first portion partially extending through said actuating arm opening and adjacent said cord opening for contacting said stop and a second portion for contacting said switch means wherein when said first portion contacts said stop, said switch means is actuated to an open position electrically disconnecting said power cord from said extension cord and wherein said switch housing, said switch means and said actuating arm are removable from said cord reel housing as a unit.

8. A trouble light and retracting extension cord reel assembly comprising:

a retracting cord reel including a cord reel housing having a side wall and an end wall, said side wall having a first aperture and a second aperture formed therein and said end wall having a cord opening formed therein;

a hand held trouble light;

an extension cord extending through said cord opening and having one end connected to said retracting cord reel and an opposite end connected to said trouble light;

a stop attached to said extension cord adjacent said hand held trouble light;

a power cord having one end adapted to be connected to a source of electrical power and an opposite end extending into said cord reel housing;

an elongated plastic switch housing mounted on an exterior surface of said side wall of said cord reel housing over said second aperture and adjacent said cord opening, said switch housing having an open side facing said side wall and an end with an actuating arm opening formed therein, said switch housing having a pivot post, at least one mounting post and at least one boss formed on an interior surface thereof;

a switch means for establishing an electrical connection or disconnection mounted in said switch housing on said mounting post and being connected between said opposite end of said power cord and said one end of said extension cord, said switch means being biased to a normally closed position for electrically connecting said power cord to said extension cord; and an actuating arm rotatably mounted in said switch housing on said pivot post and having a first portion partially extending through said actuating arm opening and adjacent said cord opening for contacting said stop and a second portion for contacting said switch means wherein when said first portion contacts said stop, said switch means is actuated to an open position electrically disconnecting said power cord from said extension cord and wherein said switch housing, said switch means and said actuating arm are removable from said cord reel housing as a unit.

* * * * *